US009744756B2

United States Patent
Chiu et al.

(10) Patent No.: US 9,744,756 B2
(45) Date of Patent: Aug. 29, 2017

(54) METHOD, APPARATUS AND COMPUTER READABLE MEDIUM FOR PRODUCING PROTOTYPE DIAGRAM OF THREE DIMENSIONAL OBJECT

(71) Applicant: Wistron Corporation, New Taipei (TW)

(72) Inventors: Yu-Wei Chiu, New Taipei (TW); Chih-Hong Chu, New Taipei (TW)

(73) Assignee: Wistron Corporation, New Taipei (TW)

( * ) Notice: Subject to any disclaimer, the term of this patent is extended or adjusted under 35 U.S.C. 154(b) by 588 days.

(21) Appl. No.: 14/505,504

(22) Filed: Oct. 3, 2014

(65) Prior Publication Data

US 2015/0343706 A1  Dec. 3, 2015

(30) Foreign Application Priority Data

May 29, 2014  (TW) .............................. 103118772 A

(51) Int. Cl.
  *B29C 67/00*  (2017.01)
  *G05B 15/02*  (2006.01)
  *B33Y 50/02*  (2015.01)

(52) U.S. Cl.
  CPC ................................... *B33Y 50/02* (2014.12)

(58) Field of Classification Search
  CPC . B33Y 50/02; B29C 67/0088; B29C 67/0092; G05B 15/02
  USPC ........................................................ 358/1.1
  See application file for complete search history.

(56) References Cited

U.S. PATENT DOCUMENTS

| 6,246,468 B1 * | 6/2001 | Dimsdale ............. | G01B 11/002 356/4.02 |
| 8,500,724 B2 * | 8/2013 | Blumenkranz ..... | A61F 9/00736 606/5 |
| 2010/0316280 A1 * | 12/2010 | Lancaster .......... | G06K 9/00214 382/154 |

* cited by examiner

*Primary Examiner* — Allen H Nguyen
(74) *Attorney, Agent, or Firm* — Jianq Chyun IP Office

(57) ABSTRACT

A method, an apparatus and a computer readable medium for producing a prototype diagram of a three dimensional (3D) object are provided. In the method, an object in a 3D diagram is scanned to determine transections and intersections at which each of the transections overlaps with the object are determined in order. Then, whether each of the intersections is supported on a neighbor transection of the transection is determined. If the intersection is not supported on the neighbor transection, a support frame is disposed on the location of the intersection between the transection and the neighbor transection. At last, all the transections are combined to produce a prototype diagram of the object.

13 Claims, 2 Drawing Sheets

METHOD, APPARATUS AND COMPUTER READABLE MEDIUM FOR PRODUCING PROTOTYPE DIAGRAM OF THREE DIMENSIONAL OBJECT

CROSS-REFERENCE TO RELATED APPLICATION

This application claims the priority benefit of Taiwan application serial no. 103118772, filed on May 29, 2014. The entirety of the above-mentioned patent application is hereby incorporated by reference herein and made a part of this specification.

BACKGROUND

Field of the Invention

The invention relates to a rapid prototyping technique and more particularly, to a method, an apparatus and a computer readable medium for producing a prototype diagram of a three dimensional (3D) object by rapidly disposing a support frame.

Description of Related Art

In recent years, with continuous development and improvement in printing techniques, 3D printing has become a quite popular business. The 3D printing is also called as an additive manufacturing technique which is a type of rapid prototyping technique which establishes a 3D object through a layer-by-layer printing manner based on a digital forming drawing file by using bonding materials, such as powdered metals or plastic materials.

Generally, in a 3D printing process, a 3D object model is produced by means of computer aided design (CAD) and then converted into a drawing file capable of being read by a rapid prototyping apparatus such as a standard template library (STL) apparatus so as to produce slicing files. Through analyzing cross sections of the 3D object by a computer, the 3D object further needs a professional technician to determine whether to set support frames for the 3D object, such that a prototype diagram of the 3D object is formed, and a physical 3D object can be produced by stacking by the rapid prototyping equipment. Additionally, complex processes such as cutting the support frames and polishing the 3D object are required to be performed on the 3D object to produce an end product. Accordingly, the workflow of the conventional 3D printing has to be operated by a professional technician. Thus, a 3D printing technique that can be operated more easily is needed to widely popularize the 3D printing technique for family use.

SUMMARY

The invention provides a method, an apparatus and a computer readable medium, in which support frames can be automatically disposed to rapidly produce a prototype diagram of a three dimensional (3D) object.

The invention provides a method for producing a prototype diagram of a 3D object. In the method, an object in a 3D diagram is scanned to determine transections, and intersections at which each of the transections overlaps with the object are determined in order. Then, whether each of the intersections is supported on a neighbor transection of the transection is determined. If the intersection is not supported on the neighbor transection, a support frame is disposed on a location of the intersection between the transection and the neighbor transection. At last, all transections are combined to produce the prototype diagram of the object.

In an embodiment of the invention, the step of scanning the object in the 3D diagram to determine the transections includes determining the transections in a forming direction of the object according to a width change of the object or according to a fixed interval.

In an embodiment of the invention, the step of determining whether each of the intersections is supported on the neighbor transection of the transection includes determining whether there is the object on a location of each intersection of each transection projected on the neighbor transection of the transection to determine whether the intersection is supported.

In an embodiment of the invention, after the step of disposing the support frame on the intersection location between the transection and the neighbor transection, the method further determines whether the intersection is supported on a next neighbor transection of the neighbor transection in a direction opposite to the forming direction and extends the support frame to the neighbor transection if the intersection is not supported on the next neighbor transection.

In an embodiment of the invention, the step of disposing the support frame on the location of the intersection between the transection and the neighbor transection further includes recording the intersection location to serve as the location to subsequently remove the support frame.

In an embodiment of the invention, before the step of scanning the object in the 3D diagram to determine the transections, the method further includes producing the 3D diagram. The step of producing the 3D diagram includes retrieving objects and attributes of each of the objects from a database, establishing a tree menu according to relevance between each of the objects and the attributes thereof and relevance between each of the attributes, displaying options corresponding to the objects in the tree menu, receiving a selection operation on the options and sequentially displaying a plurality of sub-options of the attributes of the objects corresponding the options and at last, receiving a selection operation on the sub-options to determine the attributes of the corresponding objects to produce the 3D diagram.

The invention provides an apparatus for producing a prototype diagram of a 3D object. The apparatus includes a storage unit and one or more processing units. The storage unit is used to record modules. The one or more processing units are coupled with the storage unit to access and execute the modules recorded in the storage unit. The modules include a transection determining module, an intersection determining module, a support determining module, a support frame setting module and a prototype diagram producing module. The transection determining module scans an object in a 3D diagram to determine transections. The intersection determining module determines in order at least one intersection at which each of the transections overlaps with the object. The support determining module determines whether each of the intersections is supported on a neighbor transection of the transection. If the intersection is not supported on the neighbor transection, the support frame setting module disposes a support frame on a location of the intersection between the transection and the neighbor transection. The prototype diagram producing module combines all the transections to produce a prototype diagram of the object.

In an embodiment of the invention, the transection determining module determines the transections in a forming direction of the object according to a width change of the object or according to a fixed interval.

In an embodiment of the invention, the support determining module determines in order whether there is the object on a location of each intersection of each transection projected on the neighbor transection of the transection in a direction opposite to the forming direction to determine whether the intersection is supported.

In an embodiment of the invention, the support determining module determines whether the intersection is supported on a next neighbor transection of the neighbor transection in the direction opposite to the forming direction. If the support determining module determines that the intersection is not supported on the next neighbor transection, the support frame setting module extends the support frame to the next neighbor transection.

In an embodiment of the invention, the modules further include a support frame recording module for recording the location of the intersection in the storage unit to serve as the location to subsequently remove the support frame.

In an embodiment of the invention, the apparatus further includes a touch displaying unit coupled to the one or more processing units, and the modules further include a 3D diagram producing module for producing the 3D diagram. The 3D diagram producing module first retrieves objects and attributes of each of the objects from a database, establishes a tree menu according to relevance between each of the objects and the attributes thereof and relevance between the attributes, displays options corresponding to the objects in the tree menu on the touch displaying unit, sequentially displays a plurality of sub-options of the attributes of the objects corresponding the options according to a selection operation on the options which is received by the touch displaying unit and at last, determines the attributes of the corresponding objects according to a selection operation on the sub-options which is received by the touch displaying unit, so as to produce the 3D diagram.

To sum up, in the method, the apparatus and the computer readable medium for producing the prototype diagram of the 3D object of the invention, the transections corresponding to the object in the 3D diagram is first determined to determine whether to dispose the support frame on the intersection location between the transection and the neighbor transection. Thereby, the time for drawing can be reduced, and since no professional technicians are required to participate in the operation process, the 3D printing process can be simplified.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a three dimensional (3D) printing technique, a 3D object may be formed by means of stacking from bottom to top, from left to right or in any user-defined direction. Therefore, whether an issue of insufficient support will occur has to be determined according to an object structure in a 3D diagram, so as to avoid the 3D object from collapsing during the stacking process. Accordingly, in the invention, an object is divided into a plurality of transections, and at least one intersection at which each of the transections overlaps with the object is determined. In this way, whether a support frame has to be disposed on each of the intersections is determined, such that support frames that the entire 3D object needs can be obtained. At last, the support frames are combined with the object to produce a prototype diagram suitable for 3D printing. On the other hand, in the invention, a plurality of objects and attributes of each object are provided to establish a tree menu, such that a user may select an object and attributes corresponding thereto in a simple operation manner, so as to rapidly produce a 3D diagram of the object. Thereby, a speed of drawing can be enhanced, and the printing operation can be simplified for popularizing the 3D printing technique.

Figure 1:
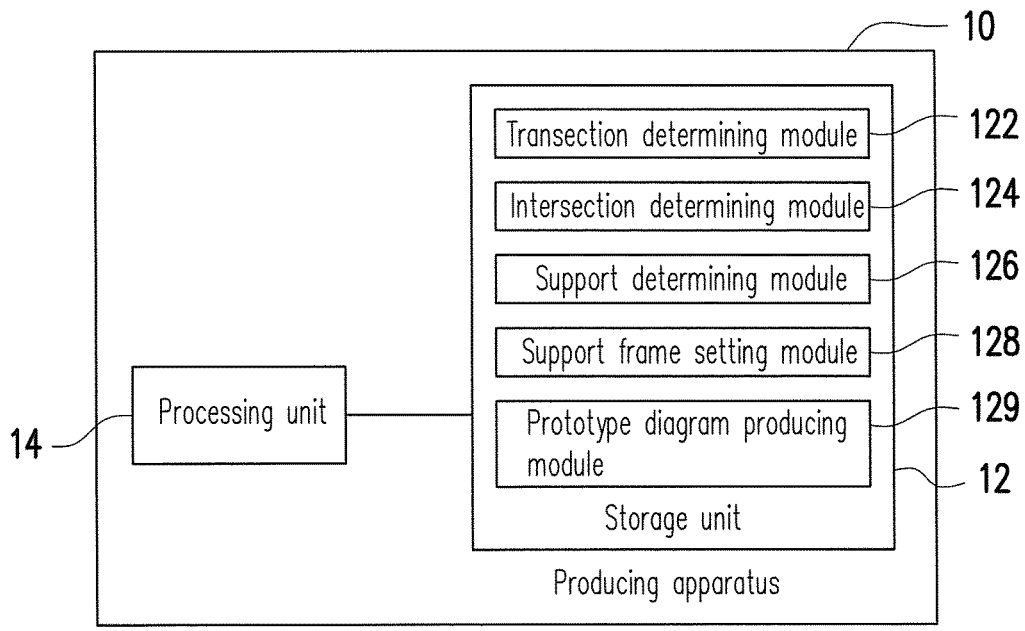
FIG. 1 is a block diagram of an apparatus for producing a prototype diagram of a three dimensional (3D) object according to an embodiment of the invention.

FIG. 1 is a block diagram of an apparatus for producing a prototype diagram of a 3D object according to an embodiment of the invention. With reference to FIG. 1, a producing apparatus 10 of the present embodiment is, for example, a desktop, a laptop or an electronic apparatus having a computing function, such as a smart phone or a tablet computer, which is not limited in the invention. The producing apparatus 10 includes a storage unit 12 and one or more processing units (only a processing unit 14 is illustrated for example, but the invention is not limited thereto), and functions thereof will be described below.

The storage unit 12 may be main memory, any type of fixed or movable random access memory (RAM), read only memory (ROM), flash memory, the like or a combination of aforementioned elements of the producing apparatus 10. In the present embodiment, the storage unit 12 serves to store software programs, such as a transection determining module 122, an intersection determining module 124, a support determining module 126, a support frame setting module 128 and a prototype diagram producing module 129. The storage unit 12 of the present embodiment is not limited to a single memory element, and each of the software modules and diagram files (e.g., a 3D diagram and a prototype diagram) of an object may be separately stored in two or more memory elements of the same type or different types.

The processing unit 14 may be, for example, a central processing unit (CPU), a microprocessor, a digital signal processor, a programmable controller, an application specific integrated circuits (ASIC), a programmable logic device (PLD) or the like which can load the modules from the storage unit 12 to control the producing apparatus 10 to produce a prototype diagram.

Figure 2:
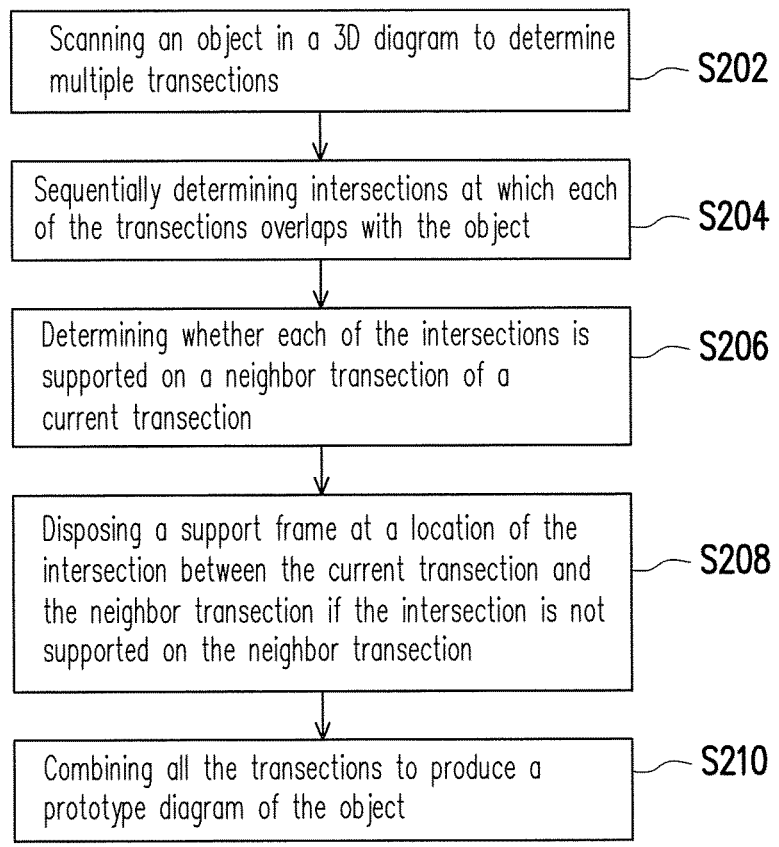
FIG. 2 is a flowchart of a method for producing a prototype diagram of a 3D object according to an embodiment of the invention.

To be detailed, FIG. 2 is a flowchart of a method for producing a prototype diagram of a 3D object according to an embodiment of the invention. With reference to FIG. 2, the method of the present embodiment is suitable for the producing apparatus 10 of FIG. 1. Detailed steps of the method for producing a prototype diagram of a 3D object operated by using each element of the producing apparatus 10 will be described below.

First, the transection determining module 122 scans an object in a 3D diagram to determine transections (step S202). The 3D diagram may be a 3D graphic file format, including 3DS, DWF, 3D, DWG, DXF, IGES, STL or the like, which is supported by computer aided design (CAD), such as Ex CAD, Pro-E, 3DS MAX or Solidworks or modeling software, and the object may be a 3D object constructed by the CAD or the modeling software.

In an embodiment, the transection determining module 122 determines the transections in a forming direction of the object according to a width change of the object or according to a fixed interval. In detail, the collapsing issue that may occur to the stacking of the object results from the forming direction of the object is from bottom to top, from left to right or in any user-defined direction during a 3D printing process. Thus, if a part of the object is not supported by other objects on the bottom, in the left or in any specific direction, the part of the object having no support will lead to a collapse. In this regard, the transection determining module 122 of the invention determines the transections according to a width change (e.g., a maximum length of the object on a transection in the horizontal, vertical or specific direction) of the object. For example, the transection determining module 122 first calculates and records a width of the object in each of the horizontal transections spaced from each other by a distance (e.g., 1 cm, 5 mm, etc.) in a forming direction (e.g., in an upward direction). If a width change is more than a threshold (e.g., a width difference between two adjacent horizontal planes is more than 2 cm), the transection determining module 122 records the horizontal plane having the larger width to serve as the transection for subsequent operations with respect to intersections. The threshold may flexibly adjusted depending on the actual size of the object, such that when a horizontal transection contacts a certain part of the object for the first time (i.e., from no contacting to the first contacting), the transection determining module 122 may determine to use the transection for subsequent operations on the intersections. In another example, the transection determining module 122 may also determine the transections per a fixed interval (e.g., 1 cm, 5 mm, etc.). It should be mentioned that the transection determining module 122 may determine the transections according to the width change of the object, the fixed interval or a combination thereof and may further select a specific direction (e.g., a leftward direction, a rightward direction, etc.) according to design requirement, rather than using the forming direction, but the invention is not limited thereto.

After the transections are determined, the intersection determining module 124 determines in order intersections at which each of the transections overlaps with the object (step S204). If a plane is formed by a part of a transection overlapping with the object, the intersection determining module 124 uses an edge or a center of the overlapping plane as an intersection for subsequently determining whether to dispose a support frame.

Then, the support determining module 126 determines whether each of the intersections is supported on a neighbor transection of the transection (step S206). In an embodiment, the support determining module 126 determines in order whether the object is on the intersection of each of the transections on the neighbor transection of the transection in an opposite direction (e.g., a downward direction, a leftward direction or the like) to the forming direction to determine whether the intersection is supported. For example, if there is an object on the neighbor transection under the transection of the intersection, the support determining module 126 determines that the intersection is supported. If no object is on the neighbor transection under the transection of the intersection, the support determining module 126 determines that the intersection is not supported. It should be mentioned that the support determining module 126 may select a direction (e.g., a leftward direction, a rightward direction or the like) according to the design requirement to determine whether the intersection is supported, which is not limited in the invention.

If the support determining module 126 determines that the intersection is not supported on the neighbor transection, the support frame setting module 128 disposes a support frame on a location of the intersection between the transection and the neighbor transection (step S208). The support frame setting module 128 disposes a pillar (e.g., a cylinder, a square column, or the like) having a fixed cross-sectional area under the intersection having no support, and a length of the pillar is a distance between the intersection and the neighbor transection thereunder. It should be mentioned that the support frame of the present embodiment may be any size or shape, and the support frame setting module 128 may also select any direction (e.g., a leftward direction, a rightward direction or the like) to dispose the support frame according to the design requirement, which is not limited in the invention.

It should be noted that the intersection may not be supported on another neighbor transection next to the neighbor transection (which is a transection next to the neighbor transection in a direction opposite to the forming direction). Thus, in an embodiment, the support determining module 126 continues to determine whether the intersection is supported on the next neighbor transection of the neighbor transection in the direction opposite to the forming direction. If the support determining module 126 determines that the intersection is not supported on the next neighbor transection, the support frame setting module 128 extends the support frame to the next neighbor transection. For example, the support frame setting module 128 extends a length of the support frame (e.g., a cylinder, a square column, or the like) to the next neighbor transection thereunder, where the length is a distance between the intersection and the transection next to the neighbor transection thereunder. It should be mentioned that the support frame setting module 128 may also select a specific direction (e.g., a leftward direction, a rightward direction or the like) according to the design requirement, which is not limited in the invention.

Figure 3:
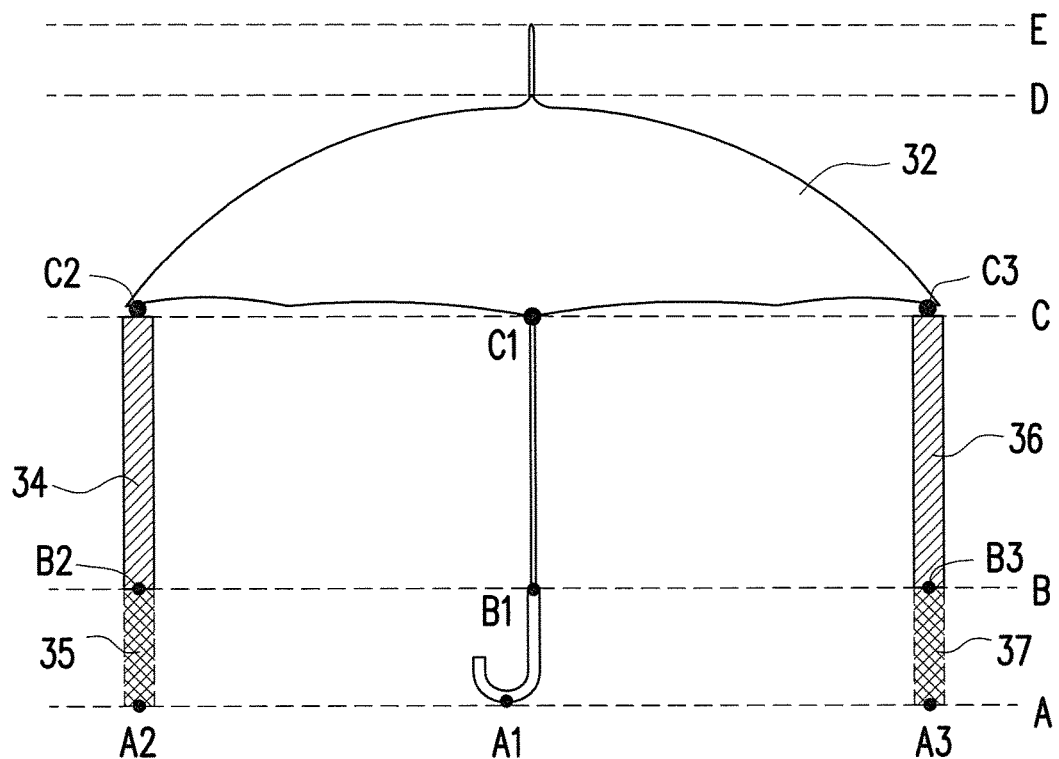
FIG. 3 illustrates an example of a 3D diagram according to an embodiment of the present invention.

FIG. 3 illustrates an example of a 3D diagram according to an embodiment of the present invention. With reference to FIG. 3, an object 32 in a 3D diagram 30 of the present embodiment is a 3D object constructed by, for example, the CAD software. The transection determining module 122 first determines transections A, B, C, D and E, and the intersection determining module 124 determines in order intersections (i.e., an intersection A1 on the transection A, an intersection B1 on the transection B, intersections C1, C2 and C3 on the transection C) at which each of the transections A through E overlaps with the object 32. The support determining module 126 determines that the intersection C1 can be stacked up through the intersection B1, which is free from the issue of collapsing stacking, but the intersections C2 and C3 cannot be stacked up from nodes B2 and B3. Accordingly, the support frame setting module 128 respectively disposes support frames 34 and 36 on locations of the intersections C2 and C3 between the transections B and C. Additionally, the support determining module 126 further determines whether the nodes B2 and B3 on the transection B extended from the intersections C2 and C3 are supported and determines that the nodes B2 and B3 are also not supported between the transection B and the next neighbor transection A. Thus, the support frame setting module 128 extends the support frames 34 and 36 to nodes A2 and A3 on the transection A (which are support frames 35 and 37).

At last, after the support frame setting module 128 completely disposes all support frames, the prototype diagram producing module 129 combines all the transections to produce a prototype diagram of the object (step S210). For example, the prototype diagram producing module 129 utilizes the CAD or modeling software to combine all the transections with the corresponding support frames to produce a 3D diagram file (e.g., in a format of 3DS, DWF, 3D, DWG, DXF, IGES or the like) or a graphic file (e.g., in a STL format) that can be read by a rapid prototype diagram apparatus. It should be mentioned that the modules recorded in the storage unit 12 may also include a support frame recording module (not shown) which records the intersection locations in the storage unit 12 to serve as locations to subsequently remove the support frames. For example, the support frame recording module may record the intersections C2 and C3 as illustrated in FIG. 3 to serve their locations as locations to subsequently remove the support frames. Additionally, the intersection locations may also serve as locations for the rapid prototype apparatus to proceed subsequently refining, which depend on application demands and are not limited in the invention.

By the method, the producing apparatus 10 of the present embodiment can determine whether to dispose the support frames and determine the locations to dispose the support frames, without human determination, and thus, the time and labor cost for drawing can be reduced.

It should be mentioned that except for disposing the support frames, the operation of drawing the 3D diagram by using the CAD software (e.g., CAD, Pro-E, 3DS MAX or Solidworks) is quite difficult for ordinary people, and thus, in the producing method and the producing apparatus of the invention, object information may also be retrieved from a gallery (graphic database), such that users are provided with an easy operation way to produce the 3D diagram. The function may be implemented by a 3D diagram producing module (not shown) recorded in the storage unit 12 of the producing apparatus 10, and an embodiment will be illustrated for description below.

In an embodiment, the producing apparatus 10 illustrated in FIG. 1 further includes a touch displaying unit (not shown) coupled to the processing units 14. The touch displaying unit may include a liquid crystal display (LCD), a light-emitting diode (LED) display, a field emission display (FED) display or may be a touch displaying unit including any type of display panel and a touch panel, such as a resistive or a capacitive touch panel, and can provide both a display and a touch control functions.

The 3D diagram producing module serves to produce the 3D diagram. The 3D diagram producing module first retrieves a plurality of objects and a plurality of attributes of each of the objects from a database and establishes the tree menu according to relevance between each of the objects and the attributes thereof and relevance between the attributes. Specifically, the 3D diagram producing module retrieves the objects (e.g., detached houses, apartments and so on) and their relative attributes (e.g., floors, room types, window types and so on) from the database of the storage device and establishes the tree menu according to relevance between the objects and the attributes. The objects are, for example, objects having physical appearances or shapes, such as buildings, machines or the like, which are not limited in the invention. For example, Table (1) is an example of a tree menu according an embodiment of the invention.

TABLE (1)

| | | | |
|---|---|---|---|
| F: Detached house | F1: Floor 3 | F11: Window facing outside | F111: Circular window<br>F112: Square window<br>F113: Triangular window |
| | | F12: No window facing outside | F121: . . .<br>F122: . . .<br>F123: . . . |
| | F2: Floor 2 | F21: Window facing outside | F211: Circular window<br>F212: Square window<br>F213: Triangular window |
| | | F22: No window facing outside | F221: . . .<br>F222: . . .<br>F223: . . . |
| G: Apartment | G1: Master bedroom | G11: Window facing outside | G111: Circular window<br>G 112: Square window<br>G113: Triangular window |
| | | G12: No window facing outside | G121: . . .<br>G122: . . .<br>G123: . . . |
| | G2: Guest room | G21: Window facing outside | G211: Circular window<br>G212: Square window<br>G213: Triangular window |
| | | G22: No window facing outside | G221: . . .<br>G222: . . .<br>G223: . . . |

In Table (1), a detached house F and an apartment G are parent options, the third floor F1 and the second floor F2 are sub-options of the detached house F, and a master bedroom G1 and a guest room G2 are in a child menu of the apartment G, and so on, which will not be repeated.

Then, the 3D diagram producing module displays options corresponding to the objects in the tree menu on the touch displaying unit, receives a selection operation of the user on the options by using the touch displaying unit and displays in order a plurality of sub-options of the attributes of the corresponding object of a selected option. The 3D diagram producing module continues to use the touch displaying unit to receive a selection of the user on the sub-options to determine the attributes of the corresponding object. For example, when receiving a selection operation of the user touching the option of detached house F, the touch displaying unit displays the options of the floors, and when receiving a selection operation of the user touching the option of third floor F1, the touch displaying unit displays the options of the window types. Likewise, the user can determine the object and the attribute thereof to be produced by means of simple selection operations.

At last, according to the object and the attribute thereof which are determined by the user, the 3D diagram producing module can produce a 3D diagram of the object. To be specific, the 3D diagram producing module, for example, corresponds the object and the attributes thereof selected by the user to model modules (e.g., a detached house module, a floor module, a window type module and so on) so as to combine the model modules to form a 3D object to produce the 3D diagram. It should be mentioned that in the present embodiment, the building objects and the attributes thereof are illustrated as an example, and in other embodiments, the present embodiment may also be applied to fields related to civil engineering and machinery, which depends on design requirement and is not limited in the invention.

Thereby, the invention can provide ordinary people with simpler operation method to establish the 3D diagram required by 3D printing, so as to simplify and shorten the time for producing the 3D diagram.

The invention further provides a non-transitory computer readable medium which records a computer program to be loaded by an electronic apparatus to execute each step of the method for producing the prototype diagram of the 3D object. The computer program is assembled by a plurality of program sections (i.e. building an organization diagram program section, approving a list program section, setting a program section, and deploying a program section). Moreover, after the plurality of program sections are loaded to the electronic apparatus and executed, the step in the method for producing the prototype diagram of the 3D object can be completed.

Based on the above, in the method, the apparatus and the computer readable medium for producing the prototype diagram of the 3D object of the invention, the transections and the corresponding intersections of the object in the 3D diagram can be computed to determine whether the support frames have to be disposed and/or extended, and the transections are combined to produce a prototype diagram required for the 3D printing process. Moreover, the invention also provides the tree menu for the user to select his/her desired object and the attributes thereof to automatically produce the 3D diagram. Through the embodiments of the invention, a method for producing the 3D object in an easy and rapid manner can be provided, which facilitates in the popularization of the 3D printing technique.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for producing a prototype diagram of a three dimensional (3D) object, comprising:
   scanning an object in a 3D diagram to determine a plurality of transections;
   determining in order at least one intersection at which each of the transections overlaps with the object;
   determining whether each of the intersections is supported on a neighbor transection of the transection;
   disposing a support frame on a location of the intersection between the transection and the neighbor transection if the intersection is not supported on the neighbor transection; and
   combining all the transections to produce the prototype diagram of the object.

2. The method as claimed in claim 1, wherein the step of scanning the object in the 3D diagram to determine the transections comprises:
   determining the transections in a forming direction of the object according to a width change of the object or according to a fixed interval.

3. The method as claimed in claim 2, wherein the step of determining whether each of the intersections is supported on the neighbor transection of the transection comprises:
   determining in order whether there is the object on a location of each intersection of each transection projected on the neighbor transection of the transection in a direction opposite to the forming direction to determine whether the intersection is supported.

4. The method as claimed in claim 1, wherein after the step of disposing the support frame on the intersection location between the transection and the neighbor transection, the method further comprises:
   determining whether the intersection is supported on a next neighbor transection of the neighbor transection in a direction opposite to the forming direction; and
   extending the support frame to the next neighbor transection if the intersection is not supported on the next neighbor transection.

5. The method as claimed in claim 1, wherein the step of disposing the support frame on the location of the intersection between the transection and the neighbor transection further comprises:
   recording the location of intersection to serve as the location to subsequently remove the support frame.

6. The method as claimed in claim 1, wherein before the step of scanning the object in the 3D diagram to determine the transections, the method further comprises:
   producing the 3D diagram, comprising:
      retrieving a plurality of objects and a plurality of attributes of each of the objects from a database and establishing a tree menu according to relevance between each of the objects and the attributes thereof and relevance between each of the attributes;
      displaying a plurality of options corresponding to the objects in the tree menu;
      receiving a selection operation on the options and sequentially displaying a plurality of sub-options of the attributes of the objects corresponding the options; and
      receiving a selection operation on the sub-options to determine the attributes of the corresponding objects to produce the 3D diagram.

7. An apparatus for producing a prototype diagram of a 3D object, comprising:
   a storage unit, recording a plurality of modules; and
   one or more processing units, coupled with the storage unit to access and execute the modules recorded in the storage unit,
   wherein the modules comprises:
      a transection determining module, scanning an object in a 3D diagram to determine a plurality of transections;
      an intersection determining module, determining in order at least one intersection at which each of the transections overlaps with the object;
      a support determining module, determining whether each of the intersections is supported on a neighbor transection of the transection;
      a support frame setting module, disposing a support frame on a location of the intersection between the transection and the neighbor transection if the intersection is not supported on the neighbor transection; and
      a prototype diagram producing module, combining all transections to produce a prototype diagram of the object.

8. The apparatus according to claim 7, wherein the transection determining module determines the transections in a forming direction of the object according to a width change of the object or according to a fixed interval.

9. The apparatus according to claim 8, wherein the support determining module determines in order whether there is the object on a location of each intersection of each transection projected on the neighbor transection of the transection in a direction opposite to the forming direction to determine whether the intersection is supported.

10. The apparatus according to claim 7, wherein the support determining module determines whether the intersection is supported on a next neighbor transection of the neighbor transection in a direction opposite to the forming direction, and the support setting module extends the support frame to the next neighbor transection if the support determining module determines that the intersection is not supported on the next neighbor transection.

11. The apparatus according to claim 7, wherein the modules further comprise:
 a support frame recording module, recording the location of the intersection in the storage unit to serve as the location to subsequently remove the support frame.

12. The apparatus according to claim 7, further comprising:
 a touch displaying unit, coupled to the one or more processing units, and
 the modules further comprise:
  a 3D diagram producing module, producing the 3D diagram and performing operations of:
   retrieving a plurality of objects and a plurality of attributes of each of the objects from a database and establishing a tree menu according to relevance between each of the objects and the attributes thereof and relevance between the attributes; displaying a plurality of options corresponding to the objects in the tree menu on the touch displaying unit; sequentially displaying a plurality of sub-options of the attributes of the objects corresponding the options according to a selection operation on the options received by the touch displaying unit; and determining the attributes of the corresponding objects according to the a selection operation on the sub-options received by the touch displaying unit to produce the 3D diagram.

13. A non-transitory computer readable medium, recording programs to be loaded by an electronic device to perform steps of:
 scanning an object in a 3D diagram to determine a plurality of transections;
 determining in order at least one intersection at which each of the transections overlaps with the object;
 determining whether each of the intersections is supported on a neighbor transection of the transection;
 disposing a support frame on a location of the intersection between the transection and the neighbor transection if the intersection is not supported on the neighbor transection; and
 combining all transections to produce a prototype diagram of the object.

\* \* \* \* \*